(12) United States Patent
Lee

(10) Patent No.: US 12,500,926 B2
(45) Date of Patent: *Dec. 16, 2025

(54) EXECUTING REAL-TIME MESSAGE MONITORING TO IDENTIFY POTENTIALLY MALICIOUS MESSAGES AND GENERATE INSTREAM ALERTS

(71) Applicant: Proofpoint, Inc., Sunnyvale, CA (US)

(72) Inventor: Thomas Lee, Berkeley, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/142,096

(22) Filed: May 2, 2023

(65) Prior Publication Data

US 2023/0269273 A1    Aug. 24, 2023

Related U.S. Application Data

(63) Continuation of application No. 17/585,164, filed on Jan. 26, 2022, now Pat. No. 11,677,782, which is a
(Continued)

(51) Int. Cl.
*H04L 51/212* (2022.01)
*H04L 9/40* (2022.01)
(Continued)

(52) U.S. Cl.
CPC ........ *H04L 63/1466* (2013.01); *H04L 51/212* (2022.05); *H04L 51/42* (2022.05); *H04L 51/56* (2022.05); *H04L 63/1425* (2013.01)

(58) Field of Classification Search
CPC ..... H04L 51/42; H04L 51/56; H04L 63/1466; H04L 63/1425; H04L 51/212
See application file for complete search history.

(56) References Cited

U.S. PATENT DOCUMENTS 8,090,393 B1    1/2012  Whitehouse
11,075,930 B1 *  7/2021  Xavier ............... H04L 63/20
(Continued)

OTHER PUBLICATIONS

Feb. 7, 2020 (WO) International Search Report and Written Opinion—App. PCT/US2019/054192.
(Continued)

*Primary Examiner* — Ryan J Jakovac
(74) *Attorney, Agent, or Firm* — Banner & Witcoff, Ltd.

(57) ABSTRACT

Aspects of the disclosure relate to identifying potentially malicious messages and generating instream alerts based on real-time message monitoring. A computing platform may monitor a plurality of messages received by a messaging server associated with an operator. Subsequently, the computing platform may detect that a message of the plurality of messages is potentially malicious. In response to detecting that the message of the plurality of messages is potentially malicious, the computing platform may execute one or more protection actions. In executing the one or more protection actions, the computing platform may generate an alert message comprising information indicating that the message of the plurality of messages is potentially malicious. Then, the computing platform may send the alert message to the messaging server, which may cause the messaging server to deliver the alert message to a computing device associated with an intended recipient of the message.

20 Claims, 9 Drawing Sheets

Related U.S. Application Data continuation of application No. 16/575,492, filed on Sep. 19, 2019, now Pat. No. 11,271,964.

(60) Provisional application No. 62/859,990, filed on Jun. 11, 2019.

(51) Int. Cl.
*H04L 51/42* (2022.01)
*H04L 51/56* (2022.01)

(56) References Cited

U.S. PATENT DOCUMENTS

| | | | |
|---|---|---|---|
| 2012/0311703 A1* | 12/2012 | Yanovsky | H04L 51/212 |
| | | | 726/22 |
| 2019/0014143 A1* | 1/2019 | Syme | H04L 63/1441 |
| 2019/0028499 A1 | 1/2019 | Cidon et al. | |
| 2019/0052655 A1* | 2/2019 | Benishti | G06Q 10/10 |
| 2020/0112544 A1 | 4/2020 | Smith | |
| 2020/0389486 A1* | 12/2020 | Jeyakumar | H04L 63/20 |
| 2022/0014543 A1* | 1/2022 | Jakobsson | H04L 63/123 |

OTHER PUBLICATIONS

Apr. 9, 2021 (US) Non-Final Office Action—U.S. Appl. No. 16/575,492.
Nov. 2, 2022—(US) Notice of Allowance—U.S. Appl. No. 16/575,492.
Aug. 18, 2022 Non-Final Office Action (US) U.S. Appl. No. 17/585,164.
Feb. 8, 2023—(US) Notice of Allowance—U.S. Appl. No. 17/585,164.

* cited by examiner

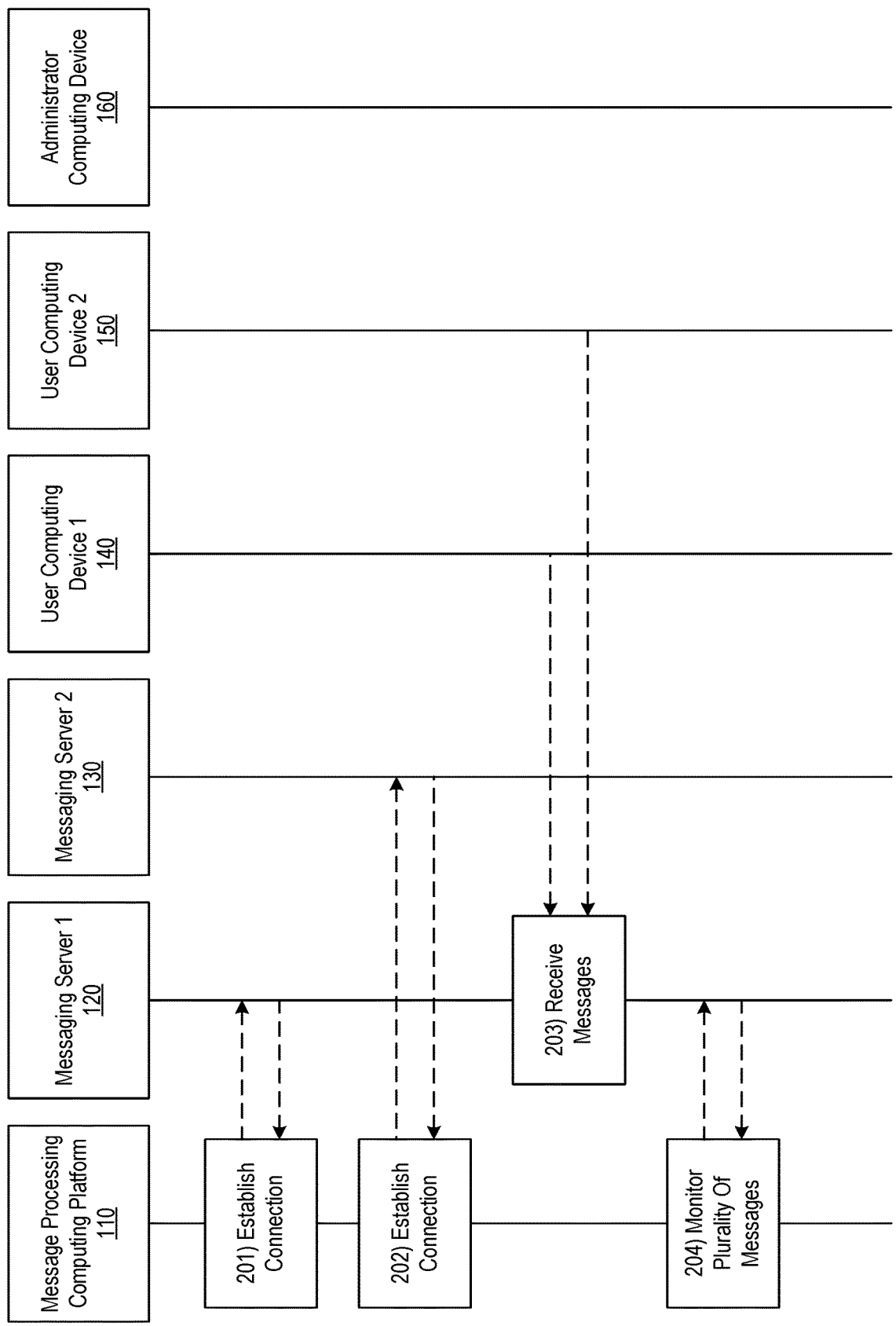

300

| Messages App | |
|---|---|
| 12345 > | >> You have won a free vacation in Florida!! Please respond with your name, credit card number, home address, and social security number, and we will mail you your cruise ticketz!! |
| Mom > | |
| Dad > | |
| | >> WARNING: The previous message you received in this thread is potentially malicious. It appears to be a phishing attempt. You should not respond to the message or share any personal information with the sender. More info @ http://___.com/phishing-prevention. |

| Messages App | |
|---|---|
| 12345 > | >> WARNING: The next message you will receive in this thread is potentially malicious. It appears to be a phishing attempt. You should not respond to the message or share any personal information with the sender. More info @ http://___.com/phishing-prevention. |
| Mom > | |
| Dad > | |
| | >> This is XXX Bank. We have received a wire for $2MM that we believe belongs to you. Please respond ASAP with your name, checking account number, home address, and social security number, and we will send you the funds! |

FIG. 4

Operator Dashboard

| System Status | Alert |
|---|---|
| Server 1 OK | Customer XXX has received a potentially malicious message. Enhanced security and monitoring controls have been applied to their user account(s). |
| Server 2 OK | |
| Server 3 Rebooting | More Details... |

Operator Dashboard

| System Status | Alert |
|---|---|
| Server 1 OK | Several of your customers are receiving potentially malicious text messages that may be associated with a phishing campaign. Enhanced security and monitoring controls have been applied to their user account(s). |
| Server 2 OK | |
| Server 3 Offline | More Details... |

600

FIG. 6

EXECUTING REAL-TIME MESSAGE MONITORING TO IDENTIFY POTENTIALLY MALICIOUS MESSAGES AND GENERATE INSTREAM ALERTS

CROSS-REFERENCE TO RELATED APPLICATIONS

This application is a continuation of U.S. patent application Ser. No. 17/585,164, filed Jan. 26, 2022, and entitled "Executing Real-Time Message Monitoring to Identify Potentially Malicious Messages and Generate Instream Alerts," which is a continuation of U.S. patent application Ser. No. 16/575,492, filed Sep. 19, 2019, and entitled "Executing Real-Time Message Monitoring to Identify Potentially Malicious Messages and Generate Instream Alerts," which claims the benefit of and priority to U.S. Provisional Patent Application Ser. No. 62/859,990, filed Jun. 11, 2019, and entitled "Generating and Providing Active Phishing Notifications," both of which are incorporated by reference herein in its entirety.

TECHNICAL FIELD

Aspects of the disclosure relate to digital data processing systems, data processing methods, machine learning systems, and communication systems and networks. In particular, one or more aspects of the disclosure relate to executing real-time message monitoring to identify potentially malicious messages and generate instream alerts.

BACKGROUND

Increasingly, users of mobile computing devices face various cybersecurity threats, from malicious phishing attempts to spam messages. While some tools have been developed to combat these threats, it remains difficult to provide relevant information to an end user in a timeframe and a manner that is most useful to and protective of the end user. This is particularly true when also trying to balance and optimize consumption of the computing resources required to provide such protective features in an automated fashion with the limitations imposed by finite processing power, constraints on network bandwidth, and limits on wireless coverage areas.

SUMMARY

Aspects of the disclosure provide technical solutions that overcome one or more of the technical problems described above and/or other technical challenges. For instance, one or more aspects of the disclosure relate to identifying potentially malicious messages and generating instream alerts based on real-time message monitoring.

In accordance with one or more embodiments, a computing platform having at least one processor, a communication interface, and memory may monitor a plurality of messages received by a messaging server associated with an operator. Subsequently, the computing platform may detect that a first message of the plurality of messages is potentially malicious. In response to detecting that the first message of the plurality of messages is potentially malicious, the computing platform may execute one or more protection actions. In executing the one or more protection actions, the computing platform may generate a first alert message comprising information indicating that the first message of the plurality of messages is potentially malicious. Then, the computing platform may send, via the communication interface, to the messaging server associated with the operator, the first alert message comprising the information indicating that the first message of the plurality of messages is potentially malicious. In addition, by sending the first alert message to the messaging server associated with the operator, the computing platform may cause the messaging server associated with the operator to deliver the first alert message comprising the information indicating that the first message of the plurality of messages is potentially malicious to at least one computing device associated with an intended recipient of the first message of the plurality of messages.

In some embodiments, monitoring the plurality of messages received by the messaging server associated with the operator may include: sending, via the communication interface, to the messaging server associated with the operator, a request for new messages being processed by the messaging server associated with the operator; and receiving, via the communication interface, from the messaging server associated with the operator, the plurality of messages.

In some embodiments, monitoring the plurality of messages received by the messaging server associated with the operator may include: monitoring one or more short message service (SMS) messages received by the messaging server for delivery; monitoring one or more multimedia messaging service (MMS) messages received by the messaging server for delivery; or monitoring one or more rich communication services (RCS) messages received by the messaging server for delivery.

In some embodiments, detecting that the first message of the plurality of messages is potentially malicious may include identifying that the first message of the plurality of messages contains spam content. In some embodiments, detecting that the first message of the plurality of messages is potentially malicious may include identifying that the first message of the plurality of messages contains phishing content.

In some embodiments, generating the first alert message comprising the information indicating that the first message of the plurality of messages is potentially malicious may include inserting, into the first alert message, a source identifier associated with the first message of the plurality of messages. In addition, sending the first alert message to the messaging server associated with the operator may cause the messaging server associated with the operator to deliver the first alert message as originating from the source identifier associated with the first message of the plurality of messages.

In some embodiments, generating the first alert message comprising the information indicating that the first message of the plurality of messages is potentially malicious may include inserting, into the first alert message, a trusted source identifier associated with the computing platform. In addition, sending the first alert message to the messaging server associated with the operator may cause the messaging server associated with the operator to deliver the first alert message as originating from the trusted source identifier associated with the computing platform.

In some embodiments, sending the first alert message to the messaging server associated with the operator may cause the messaging server associated with the operator to deliver the first alert message to the at least one computing device associated with the intended recipient of the first message of the plurality of messages prior to delivering the first message of the plurality of messages to the at least one computing device associated with the intended recipient of the first message of the plurality of messages.

In some embodiments, executing the one or more protection actions may include: generating a second alert message comprising information associated with the first message of the plurality of messages; and sending, via the communication interface, to the messaging server associated with the operator, the second alert message comprising the information associated with the first message of the plurality of messages. In addition, sending the second alert message to the messaging server associated with the operator may cause the messaging server associated with the operator to write one or more log lines to one or more system logs associated with the operator.

In some embodiments, executing the one or more protection actions may include: identifying an external entity associated with potentially malicious content included in the first message of the plurality of messages; generating a third alert message comprising information associated with the first message of the plurality of messages; and sending, via the communication interface, to a computer system associated with the external entity associated with the potentially malicious content included in the first message of the plurality of messages, the third alert message comprising the information associated with the first message of the plurality of messages.

In some embodiments, identifying the external entity associated with the potentially malicious content included in the first message of the plurality of messages may include identifying the external entity associated with the potentially malicious content included in the first message of the plurality of messages based on one or more templates associated with the external entity.

In some embodiments, generating the third alert message comprising the information associated with the first message of the plurality of messages may include inserting, into the third alert message, information indicating that the first message of the plurality of messages is associated with a malicious campaign of messages targeting users associated with the external entity.

In some embodiments, the computing platform may detect that a second message of the plurality of messages has changed from a legitimate state to a malicious state. In response to detecting that the second message of the plurality of messages has changed from the legitimate state to the malicious state, the computing platform may generate a second alert message comprising information indicating that the second message of the plurality of messages is malicious. Subsequently, the computing platform may send, via the communication interface, to the messaging server associated with the operator, the second alert message comprising the information indicating that the second message of the plurality of messages is malicious.

In some embodiments, the computing platform may monitor a second plurality of messages received by the messaging server associated with the operator. Subsequently, the computing platform may detect that a second message of the second plurality of messages is potentially malicious. In response to detecting that the second message of the second plurality of messages is potentially malicious, the computing platform may execute one or more second protection actions. In addition, executing the one or more second protection actions may include: generating a second alert message comprising information indicating that the second message of the second plurality of messages is potentially malicious; and sending, via the communication interface, to the messaging server associated with the operator, the second alert message comprising the information indicating that the second message of the second plurality of messages is potentially malicious. In addition, sending the second alert message to the messaging server associated with the operator may cause the messaging server associated with the operator to deliver the second alert message comprising the information indicating that the second message of the second plurality of messages is potentially malicious to at least one computing device associated with an intended recipient of the second message of the second plurality of messages.

In some embodiments, the computing platform may identify an external entity associated with potentially malicious content included in the second message of the second plurality of messages. Subsequently, the computing platform may identify that the external entity associated with the potentially malicious content included in the second message of the second plurality of messages is also associated with potentially malicious content included in the first message of the plurality of messages. Thereafter, the computing platform may generate a third alert message comprising information indicating that the first message of the plurality of messages and the second message of the second plurality of messages are associated with a malicious campaign of messages targeting users associated with the external entity. Then, the computing platform may send, via the communication interface, to a computer system associated with the external entity, the third alert message comprising the information indicating that the first message of the plurality of messages and the second message of the second plurality of messages are associated with the malicious campaign of messages targeting users associated with the external entity.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for executing real-time message monitoring to identify potentially malicious messages and generate instream alerts in accordance with one or more example embodiments;

FIGS. 3-6 depict illustrative user interfaces for executing real-time message monitoring to identify potentially malicious messages and generate instream alerts in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to executing real-time message monitoring to identify potentially malicious messages and generate instream alerts. For example, in some arrangements, a protection server may monitor SMS, MMS, and/or RCS messages and may generate alerts when phishing messages, spam messages, and/or other malicious messages are detected. Such alerts may be generated for an operator (which may, e.g., be responsible for delivering the message), an end user (who may, e.g., be the intended recipient of the message), and/or a third-party entity (such as a financial institution that may, e.g., be impersonated in the message). For instance, when a malicious message is detected, the protection server may inject a new alert message, which may be delivered to the end user, to alert the user that "the previous message you received is likely a phishing message."

Figure 1:
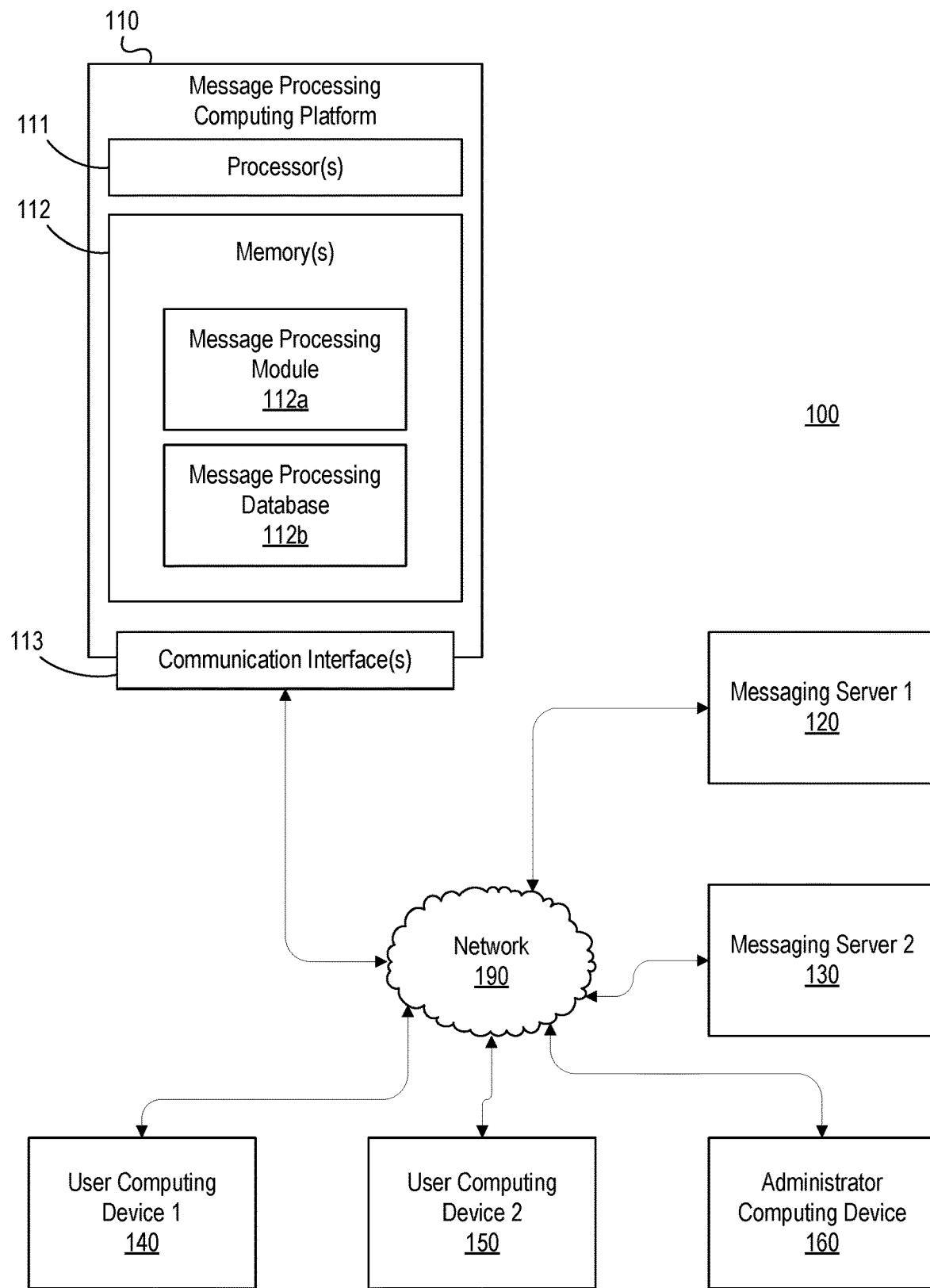
FIG. 1 depicts an illustrative operating environment for executing real-time message monitoring to identify potentially malicious messages and generate instream alerts in accordance with one or more example embodiments.

FIG. 1 depicts an illustrative operating environment for using a machine learning system to process a corpus of documents associated with a user to determine a user-specific consequence index in accordance with one or more example embodiments. Referring to FIG. 1, computing environment 100 may include various computer systems, computing devices, networks, and/or other operating infrastructure. For example, computing environment 100 may include an message processing computing platform 110, a first messaging server 120, a second messaging server 130, a first user computing device 140, a second user computing device 150, an administrator computing device 160, and a network 190.

Network 190 may include one or more wired networks and/or one or more wireless networks that interconnect message processing computing platform 110, messaging server 120, messaging server 130, user computing device 140, user computing device 150, administrator computing device 160, and/or other computer systems and/or devices. In addition, each of message processing computing platform 110, messaging server 120, messaging server 130, user computing device 140, user computing device 150, and administrator computing device 160 may be special purpose computing devices configured to perform specific functions, as illustrated in greater detail below, and may include specific computing components such as processors, memories, communication interfaces, and/or the like.

Message processing computing platform 110 may include one or more processor(s) 111, one or more memory(s) 112, and one or more communication interface(s) 113. In some instances, message processing computing platform 110 may be made up of a plurality of different computing devices, which may be distributed within a single data center or a plurality of different data centers. In these instances, the one or more processor(s) 111, one or more memory(s) 112, and one or more communication interface(s) 113 included in message processing computing platform 110 may be part of and/or otherwise associated with the different computing devices that form message processing computing platform 110.

In one or more arrangements, processor(s) 111 may control operations of message processing computing platform 110. Memory(s) 112 may store instructions that, when executed by processor(s) 111, cause message processing computing platform 110 to perform one or more functions, as discussed below. Communication interface(s) 113 may include one or more wired and/or wireless network interfaces, and communication interface(s) 113 may connect message processing computing platform 110 to one or more networks (e.g., network 190) and/or enable message processing computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause message processing computing platform 110 to perform various functions) and/or databases (which may, e.g., store data used by message processing computing platform 110 in performing various functions). For example, memory(s) 112 may store and/or otherwise provide a message processing module 112a and a message processing database 112b. In some instances, message processing module 112a may store instructions that cause message processing computing platform 110 to identify potentially malicious messages and generate instream alerts based on real-time message monitoring and/or execute one or more other functions described herein. Additionally, message processing database 112b may store data that is used by message processing computing platform 110 in identifying potentially malicious messages and generating instream alerts based on real-time message monitoring and/ or executing one or more other functions described herein.

Messaging server 120 may be configured to receive, store, and/or transmit electronic communications associated with an operator. For instance, messaging server 120 may be configured to receive, store, and/or transmit SMS messages, MMS messages, RCS messages, and/or other messages that are received from and/or are to be delivered to one or more mobile devices that are linked to customers of a first wireless service provider and/or otherwise associated with the first wireless service provider. The first wireless service provider may, for instance, operate and/or otherwise host one or more cellular networks and/or other networks that provide connectivity to such mobile devices.

Like messaging server 120, messaging server 130 may be configured to receive, store, and/or transmit electronic communications associated with an operator. For instance, messaging server 130 may be configured to receive, store, and/or transmit SMS messages, MMS messages, RCS messages, and/or other messages that are received from and/or are to be delivered to one or more mobile devices that are linked to customers of a second wireless service provider and/or otherwise associated with the second wireless service provider. The second wireless service provider may, for instance, operate and/or otherwise host one or more cellular networks and/or other networks that provide connectivity to such mobile devices, and the second wireless service provider may be different from the first wireless service provider associated with messaging server 120.

User computing device 140 may be configured to be used by a first user (who may, e.g., be a customer of the first wireless service provider and/or the second wireless service provider). In some instances, user computing device 140 may be configured to present one or more user interfaces associated with a messaging application, receive input composing new messages, display content associated with received messages, and/or otherwise facilitate sending, receiving, and/or otherwise exchanging messages and/or other data with one or more messaging servers (e.g., messaging server 120, messaging server 130).

User computing device 150 may be configured to be used by a second user (who may, e.g., be a customer of the first wireless service provider and/or the second wireless service provider and who may be different from the first user of user computing device 140). In some instances, user computing device 150 may be configured to present one or more user interfaces associated with a messaging application, receive input composing new messages, display content associated with received messages, and/or otherwise facilitate sending, receiving, and/or otherwise exchanging messages and/or other data with one or more messaging servers (e.g., messaging server 120, messaging server 130).

Administrator computing device 160 may be configured to be used by an administrative user (who may, e.g., be a network administrator of a wireless service provider monitoring messaging server 120 and/or messaging server 130 and/or a cybersecurity analyst associated with an enterprise organization operating message processing computing platform 110). Administrator computing device 160 may be configured to present one or more user interfaces associated with an operator dashboard, receive and/or display one or more alerts, and/or otherwise facilitate monitoring and management of one or more systems and/or devices included in computing environment 100.

Figure 2B:
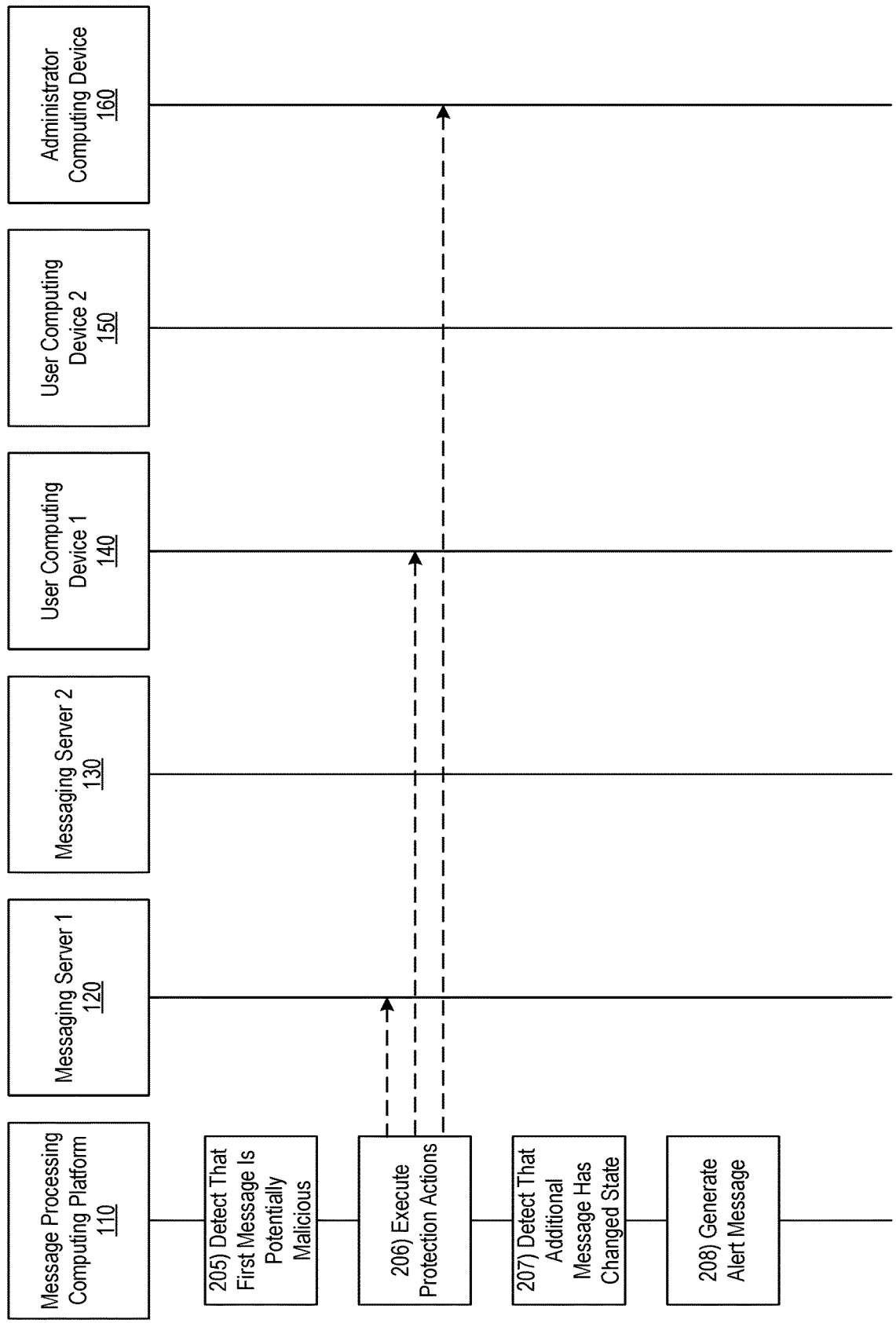

FIGS. 2A-2E depict an illustrative event sequence for executing real-time message monitoring to identify potentially malicious messages and generate instream alerts in accordance with one or more example embodiments. Referring to FIG. 2A, at step 201, message processing computing platform 110 may establish a connection with messaging server 120. For example, at step 201, message processing computing platform 110 may connect to messaging server 120 and initiate real-time monitoring of one or more message queues being processed and/or maintained by messaging server 120. At step 202, message processing computing platform 110 may establish a connection with messaging server 130. For example, at step 202, message processing computing platform 110 may connect to messaging server 130 and initiate real-time monitoring of one or more message queues being processed and/or maintained by messaging server 130.

At step 203, messaging server 120 may receive various messages from various sources (e.g., user computing device 140, user computing device 150, and/or other systems and/or devices). For example, in and/or after receiving such messages, messaging server 120 may add the messages to one or more message queues, send and/or otherwise process the messages to deliver the messages to various recipient devices, and/or send, share, and/or otherwise provide the messages and/or data associated with the messages to message processing computing platform 110 for analysis. For instance, messaging server 120 may send, share, and/or otherwise provide the messages and/or data associated with the messages to message processing computing platform 110 for analysis on a real-time basis (i.e., substantially contemporaneously with the messages being received by messaging server 120 from the various sources).

At step 204, message processing computing platform 110 may monitor messages being received by messaging server 120. For example, at step 204, message processing computing platform 110 may monitor a plurality of messages received by a messaging server (e.g., messaging server 120) associated with an operator. Message processing computing platform 110 may monitor the plurality of messages in real-time, such that message processing computing platform 110 may receive and/or analyze each message of the plurality of messages substantially contemporaneously with each message being received by messaging server 120 from a source device and/or substantially contemporaneously with each message being processed for delivery to a recipient device by messaging server 120.

In some embodiments, monitoring the plurality of messages received by the messaging server associated with the operator may include: sending, via the communication interface, to the messaging server associated with the operator, a request for new messages being processed by the messaging server associated with the operator; and receiving, via the communication interface, from the messaging server associated with the operator, the plurality of messages. For example, in monitoring the plurality of messages received by the messaging server (e.g., messaging server 120) associated with the operator at step 204, message processing computing platform 110 may send, via the communication interface (e.g., communication interface 113), to the messaging server (e.g., messaging server 120) associated with the operator, a request for new messages being processed by the messaging server (e.g., messaging server 120) associated with the operator. Messaging server 120 may receive and respond to the request by providing the requested messages. Subsequently, message processing computing platform 110 may receive, via the communication interface (e.g., communication interface 113), from the messaging server (e.g., messaging server 120) associated with the operator, the plurality of messages.

In some embodiments, monitoring the plurality of messages received by the messaging server associated with the operator may include: monitoring one or more short message service (SMS) messages received by the messaging server for delivery; monitoring one or more multimedia messaging service (MMS) messages received by the messaging server for delivery; or monitoring one or more rich communication services (RCS) messages received by the messaging server for delivery. For example, in monitoring the plurality of messages received by the messaging server (e.g., messaging server 120) associated with the operator at step 204, message processing computing platform 110 may monitor one or more short message service (SMS) messages received by the messaging server (e.g., messaging server 120) for delivery. Additionally or alternatively, in monitoring the plurality of messages received by the messaging server (e.g., messaging server 120) associated with the operator at step 204, message processing computing platform 110 may monitor one or more multimedia messaging service (MMS) messages received by the messaging server (e.g., messaging server 120) for delivery. Additionally or alternatively, in monitoring the plurality of messages received by the messaging server (e.g., messaging server 120) associated with the operator at step 204, message processing computing platform 110 may monitor one or more rich communication services (RCS) messages received by the messaging server (e.g., messaging server 120) for delivery.

Referring to FIG. 2B, at step 205, message processing computing platform 110 may detect that one of the messages that was received by messaging server 120 and monitored by message processing computing platform 110 is potentially malicious. For example, at step 205, message processing computing platform 110 may detect that a first message of the plurality of messages is potentially malicious. For instance, message processing computing platform 110 may analyze the first message and determine that it is a phishing message, a spam message, or otherwise malicious, using various models, algorithms, and/or analysis tools. Such models may include supervised and/or unsupervised machine learning models that have been trained to distinguish legitimate messages from phishing messages, spam messages, and/or other potentially malicious messages based on various features of such messages. For instance, by applying and/or otherwise executing such machine learning models, message processing computing platform 110 may distinguish between legitimate messages and potentially malicious messages based on the length of a given message, a source of the message, one or more keywords included in the message, one or more links included in the message, other content included in the message, and/or other features of the message. Based on this determination, message processing computing platform 110 may update status information associated with the first message (e.g., to indicate that the first message is a phishing message, a spam message, or otherwise malicious). Such status information may, for instance, be maintained by message processing computing platform 110 and/or by another computer system in computing environment 100. In addition, updating such status information may trigger one or more protection actions to be executed by message processing computing platform 110, as discussed in greater detail below.

In some embodiments, detecting that the first message of the plurality of messages is potentially malicious may include identifying that the first message of the plurality of messages contains spam content. For example, in detecting that the first message of the plurality of messages is potentially malicious at step 205, message processing computing platform 110 may identify that the first message of the plurality of messages contains spam content (e.g., based on applying and/or otherwise executing one or more machine learning models, as discussed above).

In some embodiments, detecting that the first message of the plurality of messages is potentially malicious may include identifying that the first message of the plurality of messages contains phishing content. For example, in detecting that the first message of the plurality of messages is potentially malicious at step 205, message processing computing platform 110 may identify that the first message of the plurality of messages contains phishing content (e.g., based on applying and/or otherwise executing one or more machine learning models, as discussed above).

At step 206, message processing computing platform 110 may execute one or more protection actions (e.g., based on detecting that one of the messages that was received by messaging server 120 and monitored by message processing computing platform 110 is potentially malicious). For example, at step 206, in response to detecting that the first message of the plurality of messages is potentially malicious, message processing computing platform 110 may execute one or more protection actions. In addition, in executing the one or more protection actions, message processing computing platform 110 may generate a first alert message comprising information indicating that the first message of the plurality of messages is potentially malicious. For instance, message processing computing platform 110 may generate such a message by populating one or more message-specific fields in an alert message template maintained by message processing computing platform 110. Subsequently, message processing computing platform 110 may send, via the communication interface (e.g., communication interface 113), to the messaging server (e.g., messaging server 120) associated with the operator, the first alert message comprising the information indicating that the first message of the plurality of messages is potentially malicious. Additionally, by sending the first alert message to the messaging server (e.g., messaging server 120) associated with the operator, message processing computing platform 110 may cause the messaging server (e.g., messaging server 120) associated with the operator to deliver the first alert message comprising the information indicating that the first message of the plurality of messages is potentially malicious to at least one computing device (e.g., user computing device 140) associated with an intended recipient of the first message of the plurality of messages.

For instance, in providing an alert to the intended recipient of the first message of the plurality of messages at step 206, message processing computing platform 110 may allow and/or cause messaging server 120 to deliver the potentially-malicious message to the intended recipient's device (e.g., user computing device 140) and subsequently may inject and/or cause messaging server 120 to deliver the alert message after the potentially-malicious message. In addition, the alert message may include information warning the intended recipient of the first message of the plurality of messages that the previous message is likely a phishing message, a spam message, or otherwise malicious, as illustrated in greater detail below. Furthermore, because message processing computing platform 110 may monitor messages and generate alerts in real-time as messages are being received by the messaging server (e.g., messaging server 120), the alert message may be sent to the intended recipient's device (e.g., user computing device 140) relatively soon after the potentially malicious message, so that the alert message is temporally relevant and contextually relevant to user of the device.

In some instances, in sending such an alert message to a messaging server (e.g., messaging server 120), which may deliver the alert message to a recipient device (e.g., user computing device 140), message processing computing platform 110 may cause such a recipient device (e.g., user computing device 140) to display and/or otherwise present one or more graphical user interfaces. For example, message processing computing platform 110 may cause the recipient device (e.g., user computing device 140) to display and/or otherwise present a graphical user interface similar to graphical user interface 300, which is illustrated in FIG. 3. As seen in FIG. 3, graphical user interface 300 may include a view presented by a messages app executing on the recipient device (e.g., user computing device 140), which may present both the potentially malicious message (e.g., "You have won a free vacation in Florida!! Please respond with your name, credit card number, home address, and social security number, and we will mail you your cruise ticketz! !") and the alert message generated by message processing computing platform 110 (e.g., "WARNING: The previous message you received in this thread is potentially malicious. It appears to be a phishing attempt. You should not respond to the message or share any personal information with the sender. More info @ http://_____.com/phishing-prevention."). This example graphical user interface may be displayed by the recipient device (e.g., user computing device 140) after receiving the alert message from messaging server 120 (which may, e.g., deliver the potentially malicious message and the alert message to user computing device 140) and/or after receiving the alert message directly from message processing computing platform 110 (which may, e.g., in some instances, send the alert message directly to a recipient device, such as user computing device 140, instead of or in addition to sending the alert message to messaging server 120).

In some embodiments, generating the first alert message comprising the information indicating that the first message of the plurality of messages is potentially malicious may include inserting, into the first alert message, a source identifier associated with the first message of the plurality of messages. In addition, sending the first alert message to the messaging server associated with the operator may cause the messaging server associated with the operator to deliver the first alert message as originating from the source identifier associated with the first message of the plurality of messages. For example, in generating the first alert message comprising the information indicating that the first message of the plurality of messages is potentially malicious at step 206, message processing computing platform 110 may insert, into the first alert message, a source identifier associated with the first message of the plurality of messages. For instance, message processing computing platform 110 may insert the source telephone number of the potentially malicious message into the first alert message, so that the first alert message appears to the intended recipient device (e.g., user computing device 140) as being sent from the same source as the potentially malicious message. In addition, by sending the first alert message to the messaging server (e.g., messaging server 120) associated with the operator, message processing computing platform 110 may cause the messaging server (e.g., messaging server 120) associated with the operator to deliver the first alert message as originating from the source identifier (e.g., the same telephone number) associated with the first message of the plurality of messages. For instance, message processing computing platform 110 may cause messaging server 120 to send the alert message to user computing device 140 from the same telephone number as the potentially-malicious message, so that the alert message appears in the same conversation thread as the potentially-malicious message (e.g., in the messages app executing on user computing device 140).

In some embodiments, generating the first alert message comprising the information indicating that the first message of the plurality of messages is potentially malicious may include inserting, into the first alert message, a trusted source identifier associated with the computing platform. In addition, sending the first alert message to the messaging server associated with the operator may cause the messaging server associated with the operator to deliver the first alert message as originating from the trusted source identifier associated with the computing platform. For example, in generating the first alert message comprising the information indicating that the first message of the plurality of messages is potentially malicious at step 206, message processing computing platform 110 may insert, into the first alert message, a trusted source identifier associated with the computing platform (e.g., message processing computing platform 110). For instance, message processing computing platform 110 may insert a trusted telephone number linked to message processing computing platform 110 into the first alert message, so that the first alert message appears to the intended recipient device (e.g., user computing device 140) as being sent from the computing platform (e.g., message processing computing platform 110), such that the alert message may be trusted by the user of the intended recipient device (e.g., user computing device 140). In addition, by sending the first alert message to the messaging server (e.g., messaging server 120) associated with the operator, message processing computing platform 110 may cause the messaging server (e.g., messaging server 120) associated with the operator to deliver the first alert message as originating from the trusted source identifier associated with the computing platform (e.g., message processing computing platform 110). For instance, message processing computing platform 110 may cause messaging server 120 to send the alert message to user computing device 140 from a trusted telephone number linked to message processing computing platform 110.

In some embodiments, sending the first alert message to the messaging server associated with the operator may cause the messaging server associated with the operator to deliver the first alert message to the at least one computing device associated with the intended recipient of the first message of the plurality of messages prior to delivering the first message of the plurality of messages to the at least one computing device associated with the intended recipient of the first message of the plurality of messages. For example, in sending the first alert message to the messaging server (e.g., messaging server 120) associated with the operator at step 206, message processing computing platform 110 may cause the messaging server (e.g., messaging server 120) associated with the operator to deliver the first alert message to the at least one computing device (e.g., user computing device 140) associated with the intended recipient of the first message of the plurality of messages prior to delivering the first message of the plurality of messages to the at least one computing device (e.g., user computing device 140) associated with the intended recipient of the first message of the plurality of messages. For instance, when providing an alert message, message processing computing platform 110 may, in some arrangements, command and/or control the messaging server (e.g., messaging server 120) to hold the potentially malicious message, so that the alert message may be delivered to the intended recipient device (e.g., user computing device 140) before the potentially malicious message. After commanding and/or controlling messaging server 120 to hold the potentially malicious message, message processing computing platform 110 may inject the alert message into the message queue being maintained and/or processed on messaging server 120, thereby triggering and/or otherwise causing messaging server 120 to deliver the alert message to the intended recipient device (e.g., user computing device 140). Then, after the alert message has been delivered to the intended recipient device (e.g., user computing device 140), message processing computing platform 110 may command/or control messaging server 120 to release the potentially malicious message that was being held. In these instances, message processing computing platform 110 may generate an alert message that includes information warning the user of the intended recipient device (e.g., user computing device 140) that the next message is likely a phishing message, a spam message, or otherwise malicious.

For example, in generating and/or sending such an alert message at step 206, message processing computing platform 110 may cause the recipient device (e.g., user computing device 140) to display and/or otherwise present a graphical user interface similar to graphical user interface 400, which is illustrated in FIG. 4. As seen in FIG. 4, graphical user interface 400 may include a view presented by a messages app executing on the recipient device (e.g., user computing device 140), which may present both the alert message generated by message processing computing platform 110 (e.g., "WARNING: The next message you will receive in this thread is potentially malicious. It appears to be a phishing attempt. You should not respond to the message or share any personal information with the sender. More info @ http://_____.com/phishing-prevention.") and the potentially malicious message (e.g., "This is XXX Bank. We have received a wire for $2MM that we believe belongs to you. Please respond ASAP with your name, checking account number, home address, and social security number, and we will send you the funds!").

In some embodiments, executing the one or more protection actions may include: generating a second alert message comprising information associated with the first message of the plurality of messages; and sending, via the communication interface, to the messaging server associated with the operator, the second alert message comprising the information associated with the first message of the plurality of messages. In addition, sending the second alert message to the messaging server associated with the operator may cause the messaging server associated with the operator to write one or more log lines to one or more system logs associated with the operator. For example, in executing the one or more protection actions at step 206, message processing computing platform 110 may generate a second alert message comprising information associated with the first message of the plurality of messages. Subsequently, message processing computing platform 110 may send, via the communication interface (e.g., communication interface 113), to the messaging server (e.g., messaging server 120) associated with the operator, the second alert message comprising the information associated with the first message of the plurality of messages. In addition, by sending the second alert message to the messaging server (e.g., messaging server 120) associated with the operator, message processing computing platform 110 may cause the messaging server (e.g., messaging server 120) associated with the operator to write one or more log lines to one or more system logs associated with the operator. For instance, message processing computing platform 110 may generate and send one or more alerts to the operator (which may, e.g., be a wireless carrier that operates a wireless network and is responsible for delivering the first message to an intended recipient). In addition, in providing an alert to the operator, message processing computing platform 110 may write one or more log lines to one or more system logs monitored by the operator. The log lines may identify the sender of the first message, the recipient of the first message, the body of the first message, a fingerprint of the first message, a category of the first message, and/or other information associated with the first message. Such log lines may enable the operator associated with messaging server 120 to create and/or track analytics associated with potentially malicious messages and/or perform other risk mitigation actions.

In some embodiments, executing the one or more protection actions may include: identifying an external entity associated with potentially malicious content included in the first message of the plurality of messages; generating a third alert message comprising information associated with the first message of the plurality of messages; and sending, via the communication interface, to a computer system associated with the external entity associated with the potentially malicious content included in the first message of the plurality of messages, the third alert message comprising the information associated with the first message of the plurality of messages. For example, in executing the one or more protection actions at step 206, message processing computing platform 110 may identify an external entity associated with potentially malicious content included in the first message of the plurality of messages, such as a third-party entity (which may, e.g., be impersonated in the first message of the plurality of messages). Subsequently, message processing computing platform 110 may generate a third alert message comprising information associated with the first message of the plurality of messages. Then, message processing computing platform 110 may send, via the communication interface (e.g., communication interface 113), to a computer system associated with the external entity associated with the potentially malicious content included in the first message of the plurality of messages, the third alert message comprising the information associated with the first message of the plurality of messages. In this way, message processing computing platform 110 may generate and send one or more alerts to a third-party entity (which may, e.g., be impersonated in the first message). For instance, in providing an alert to a third-party entity, message processing computing platform 110 may identify the third-party entity being impersonated in the first message. Such identification may be performed by message processing computing platform 110 based on detecting one or more names and/or keywords in the first message and/or by matching the first message against one or more templates. In addition, in providing an alert to a third-party entity, message processing computing platform 110 may provide a third-party server associated with the third-party entity with information identifying a sender of the message, a recipient of the message, and/or body content of the message. This alert may notify the third-party entity (which may, e.g., be a financial institution) of potential malicious and/or unauthorized activity involving a specific customer's account.

In some instances, in generating and sending such an alert message to a computer system associated with an external entity, message processing computing platform 110 may cause the computer system associated with the external entity to display and/or otherwise present a graphical user interface similar to graphical user interface 500, which is illustrated in FIG. 5. As seen in FIG. 5, graphical user interface 500 may include a view presented by an operator dashboard application or page executing on the computer system associated with an external entity, which may present the alert message generated by message processing computing platform 110 (e.g., "Customer XXX has received a potentially malicious message. Enhanced security and monitoring controls have been applied to their user account(s). More Details . . . ").

In some embodiments, identifying the external entity associated with the potentially malicious content included in the first message of the plurality of messages may include identifying the external entity associated with the potentially malicious content included in the first message of the plurality of messages based on one or more templates associated with the external entity. For example, in identifying the external entity associated with the potentially malicious content included in the first message of the plurality of messages, message processing computing platform 110 may identify the external entity associated with the potentially malicious content included in the first message of the plurality of messages based on one or more templates (which may, e.g., be maintained by message processing computing platform 110) associated with the external entity. For instance, message processing computing platform 110 may store a list of keywords and/or templates, which may be used by message processing computing platform 110 in determining how to react when phishing messages and/or other malicious messages are detected. For example, the keywords may be generic (e.g., "bank") and specific (e.g., "XXX Bank"). The templates may be provided to message processing computing platform 110 by various different third-party entities and may indicate what legitimate messages sent by a particular third-party entity look like. Each third-party entity also may provide to message processing computing platform 110 a list of opted-in recipients (which may, e.g., include a data feed of end-user telephone numbers associated with users who have opted into this alerting service). In some instances, in addition to or instead of using keywords, message processing computing platform 110 may perform external entity identification using one or more machine-learning models (e.g., to identify the third-party entity being impersonated in the first message). For instance, such models (which may, e.g., be created on and/or used by message processing computing platform 110) may be trained to recognize and/or distinguish between specific features of messages created and/or sent by various external entities.

In some embodiments, generating the third alert message comprising the information associated with the first message of the plurality of messages may include inserting, into the third alert message, information indicating that the first message of the plurality of messages is associated with a malicious campaign of messages targeting users associated with the external entity. For example, in generating the third alert message comprising the information associated with the first message of the plurality of messages, message processing computing platform 110 may insert, into the third alert message, information indicating that the first message of the plurality of messages is associated with a malicious campaign of messages targeting users associated with the external entity. For instance, message processing computing platform 110 may detect that the first message is part of a campaign of messages targeting multiple customers associated with the same third-party entity, such as a phishing campaign targeting various customers of the same financial institution. In these instances, message processing computing platform 110 may generate and send a campaign alert that includes information indicating that the campaign has occurred and/or is on-going, along with other information associated with the various messages corresponding to the campaign.

At step 207, message processing computing platform 110 may detect that an additional message (e.g., of the messages monitored by message processing computing platform 110 at step 204) has changed state. For example, at step 207, message processing computing platform 110 may detect that a second message of the plurality of messages has changed from a legitimate state to a malicious state.

At step 208, message processing computing platform 110 may generate an alert message. For example, at step 208, in response to detecting that the second message of the plurality of messages has changed from the legitimate state to the malicious state, message processing computing platform 110 may generate a second alert message comprising information indicating that the second message of the plurality of messages is malicious.

Figure 2C:
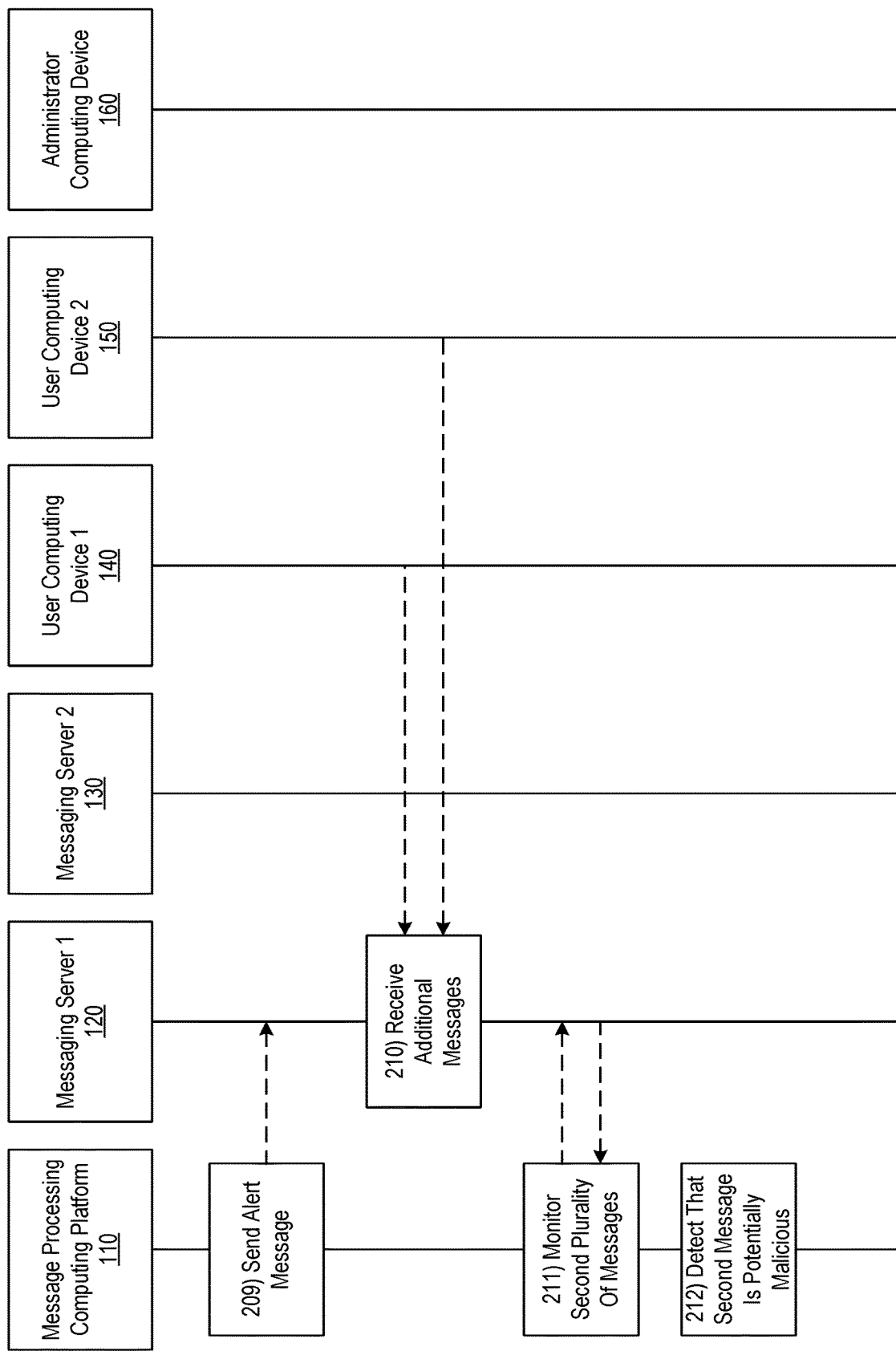

Referring to FIG. 2C, at step 209, message processing computing platform 110 may send an alert message to messaging server 120. For example, at step 209, message processing computing platform 110 may send, via the communication interface (e.g., communication interface 113), to the messaging server (e.g., messaging server 120) associated with the operator, the second alert message comprising the information indicating that the second message of the plurality of messages is malicious. In this way, and as illustrated with respect to steps 207 to 209, message processing computing platform 110 may, in some instances, generate and send one or more alerts at a relatively longer time period after the first message is delivered. Such relatively later alerts may, for instance, be generated by message processing computing platform 110 based on a periodic reanalysis of previously-classified messages. For example, message processing computing platform 110 may store fingerprints associated with individual messages for a predetermined amount of time (e.g., 8 hours). Subsequently, message processing computing platform 110 may generate and/or send one or more alerts (e.g., alert messages, warning messages, log lines, etc.) based on detecting that a previously classified message has changed state (e.g., the message was previously classified as 'legitimate' and is now classified as 'phishing' or otherwise malicious).

At step 210, messaging server 120 may receive additional messages from various sources (e.g., user computing device 140, user computing device 150, and/or other systems and/or devices). For example, in and/or after receiving such messages, messaging server 120 may add the additional messages to one or more message queues, send and/or otherwise process the messages to deliver the messages to various recipient devices, and/or send, share, and/or otherwise provide the messages and/or data associated with the messages to message processing computing platform 110 for analysis. For instance, messaging server 120 may send, share, and/or otherwise provide the additional messages and/or data associated with the messages to message processing computing platform 110 for analysis on a real-time basis (i.e., substantially contemporaneously with the messages being received by messaging server 120 from the various sources).

At step 211, message processing computing platform 110 may monitor the additional messages being received by messaging server 120. For example, at step 211, message processing computing platform 110 may monitor a second plurality of messages received by the messaging server (e.g., messaging server 120) associated with the operator. Message processing computing platform 110 may monitor the second plurality of messages in real-time, such that message processing computing platform 110 may receive and/or analyze each message of the second plurality of messages substantially contemporaneously with each message being received by messaging server 120 from a source device and/or substantially contemporaneously with each message being processed for delivery to a recipient device by messaging server 120.

At step 212, message processing computing platform 110 may detect that one of the additional messages (e.g., monitored by message processing computing platform 110 at step 211) is potentially malicious. For example, at step 212, message processing computing platform 110 may detect that a second message of the second plurality of messages is potentially malicious.

Figure 2D:
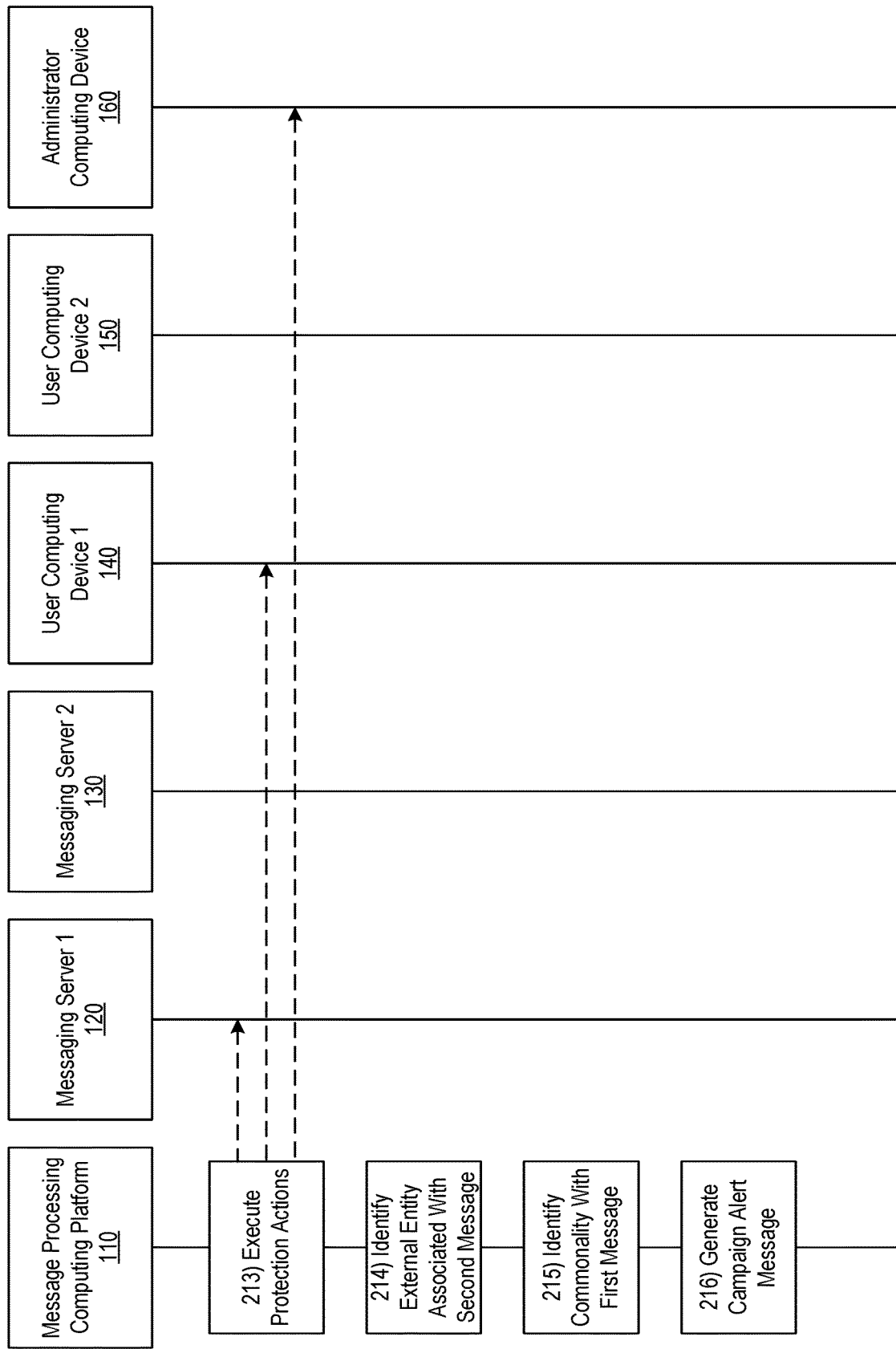

Referring to FIG. 2D, at step 213, message processing computing platform 110 may execute one or more protection actions. For example, at step 213, in response to detecting that the second message of the second plurality of messages is potentially malicious, message processing computing platform 110 may execute one or more second protection actions. In addition, in executing the one or more second protection actions, message processing computing platform 110 may generate a second alert message comprising information indicating that the second message of the second plurality of messages is potentially malicious. For instance, message processing computing platform 110 may generate the second alert message similar to how message processing computing platform 110 may generate the first alert message in the examples discussed above. Subsequently, message processing computing platform 110 may send, via the communication interface (e.g., communication interface 113), to the messaging server (e.g., messaging server 120) associated with the operator, the second alert message comprising the information indicating that the second message of the second plurality of messages is potentially malicious. In addition, by sending the second alert message to the messaging server (e.g., messaging server 120) associated with the operator, message processing computing platform 110 may cause the messaging server (e.g., messaging server 120) associated with the operator to deliver the second alert message comprising the information indicating that the second message of the second plurality of messages is potentially malicious to at least one computing device (e.g., user computing device 140) associated with an intended recipient of the second message of the second plurality of messages.

At step 214, message processing computing platform 110 may identify an external entity associated with the second message. For example, at step 214, message processing computing platform 110 may identify an external entity associated with potentially malicious content included in the second message of the second plurality of messages. For instance, message processing computing platform 110 may identify the external entity associated with the second message, similar to how message processing computing platform 110 may identify an external entity in the examples discussed above.

At step 215, message processing computing platform 110 may identify a commonality between the first message and the second message (e.g., that the same external entity associated with the second message is also associated with the first message). For example, at step 215, message processing computing platform 110 may identify that the external entity associated with the potentially malicious content included in the second message of the second plurality of messages is also associated with potentially malicious content included in the first message of the plurality of messages.

At step 216, message processing computing platform 110 may generate a campaign alert message (e.g., based on identifying a commonality across multiple different potentially malicious messages). For example, at step 216, message processing computing platform 110 may generate a third alert message comprising information indicating that the first message of the plurality of messages and the second message of the second plurality of messages are associated with a malicious campaign of messages targeting users associated with the external entity. Message processing computing platform 110 may, for instance, generate such a campaign alert message based on one or more alert message templates maintained by message processing computing platform 110.

Figure 2E:
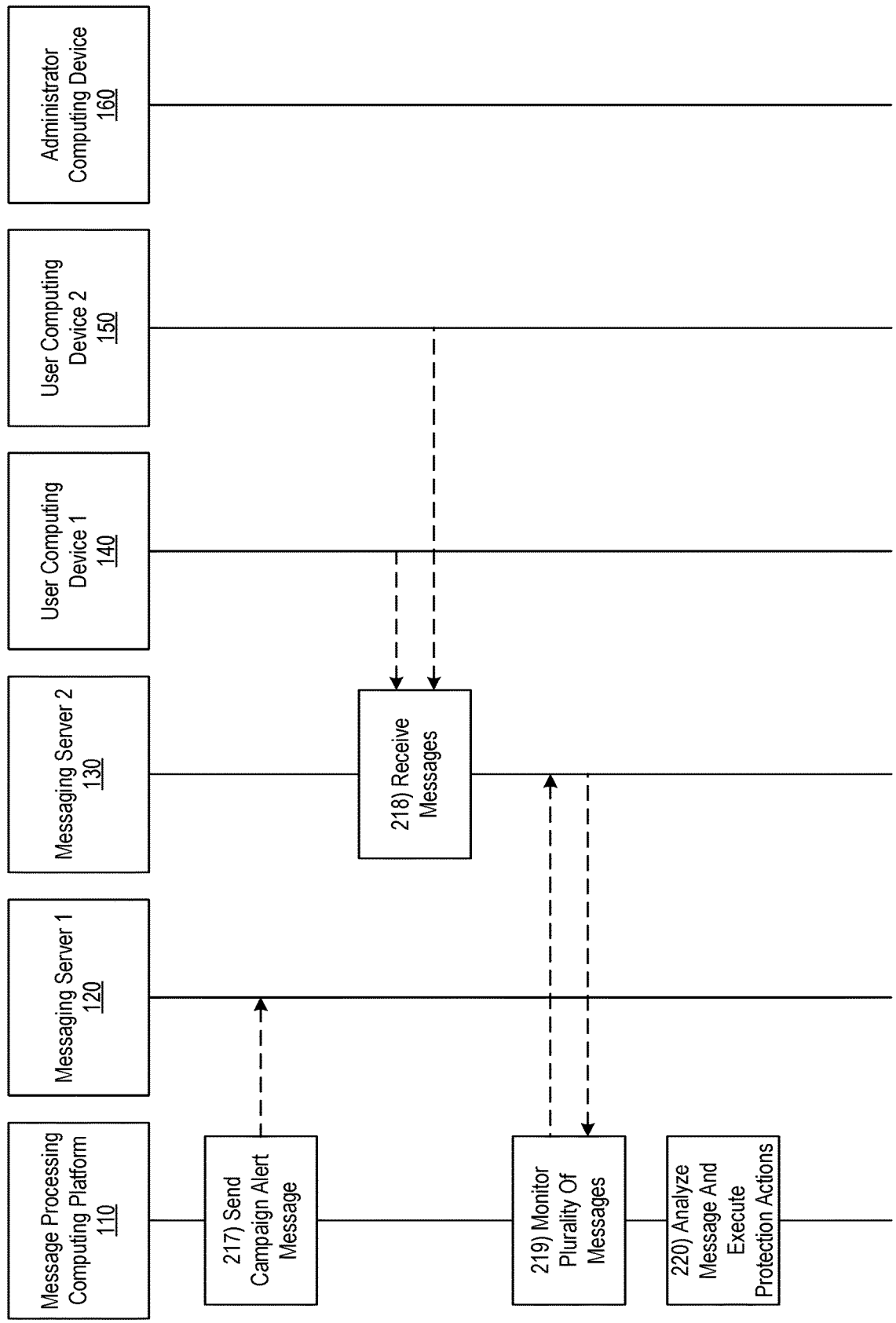

Referring to FIG. 2E, at step 217, message processing computing platform 110 may send the campaign alert message to an external entity system (which may, e.g., include sending such an alert message directly to the external entity system and/or sending such an alert message indirectly to the external entity system via messaging server 120). For example, at step 217, message processing computing platform 110 may send, via the communication interface (e.g., communication interface 113), to a computer system associated with the external entity, the third alert message comprising the information indicating that the first message of the plurality of messages and the second message of the second plurality of messages are associated with the malicious campaign of messages targeting users associated with the external entity. In some instances, message processing computing platform 110 also may link one or more additional messages received and/or monitoring from a different messaging server (e.g., messaging server 130) associated with a different operator and/or other messages to the same campaign, and may include information associated with such messages in the campaign alert that is generated at step 216 and sent at step 217.

Additionally or alternatively, in sending the third alert message comprising the information indicating that the first message of the plurality of messages and the second message of the second plurality of messages are associated with the malicious campaign of messages targeting users associated with the external entity, message processing computing platform 110 may cause the computer system associated with the external entity to display and/or otherwise present a graphical user interface similar to graphical user interface 600, which is illustrated in FIG. 6. As seen in FIG. 6, graphical user interface 600 may include a view presented by an operator dashboard application or page executing on the computer system associated with an external entity, which may present the alert message generated by message processing computing platform 110 (e.g., "Several of your customers are receiving potentially malicious text messages that may be associated with a phishing campaign. Enhanced security and monitoring controls have been applied to their user account(s). More Details . . . ").

At step 218, messaging server 130 may receive various messages from various sources (e.g., user computing device 140, user computing device 150, and/or other systems and/or devices). For example, in and/or after receiving such messages, messaging server 130 may add the messages to one or more message queues, send and/or otherwise process the messages to deliver the messages to various recipient devices, and/or send, share, and/or otherwise provide the messages and/or data associated with the messages to message processing computing platform 110 for analysis. For instance, messaging server 130 may send, share, and/or otherwise provide the messages and/or data associated with the messages to message processing computing platform 110 for analysis on a real-time basis (i.e., substantially contemporaneously with the messages being received by messaging server 120 from the various sources).

At step 219, message processing computing platform 110 may monitor messages being received by messaging server 130. For example, at step 219, message processing computing platform 110 may monitor a plurality of messages received by the second messaging server (e.g., messaging server 130) associated with a different operator than the first messaging server (e.g., messaging server 120). Message processing computing platform 110 may monitor the plurality of messages in real-time, such that message processing computing platform 110 may receive and/or analyze each message of the plurality of messages substantially contemporaneously with each message being received by messaging server 130 from a source device and/or substantially contemporaneously with each message being processed for delivery to a recipient device by messaging server 130.

At step 220, message processing computing platform 110 may analyze the messages being received from and/or monitored with respect to messaging server 130 and execute one or more protection actions. For instance, message processing computing platform 110 may analyze such messages to detect whether any of the messages are potentially malicious, and responsive to detecting that one or more of the messages are potentially malicious, message processing computing platform 110 may execute one or more protection actions, similar to how message processing computing platform 110 may execute one or more protection actions in the examples discussed above.

Figure 7:
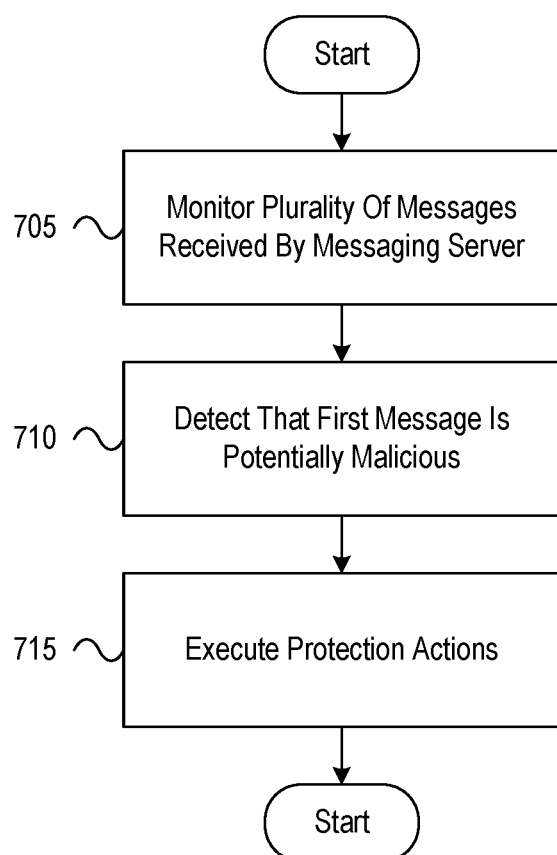
FIG. 7 depicts an illustrative method for executing real-time message monitoring to identify potentially malicious messages and generate instream alerts in accordance with one or more example embodiments.

FIG. 7 depicts an illustrative method for executing real-time message monitoring to identify potentially malicious messages and generate instream alerts in accordance with one or more example embodiments. Referring to FIG. 7, at step 705, a computing platform having at least one processor, a communication interface, and memory may monitor a plurality of messages received by a messaging server associated with an operator. At step 710, the computing platform may detect that a first message of the plurality of messages is potentially malicious. At step 715, in response to detecting that the first message of the plurality of messages is potentially malicious, the computing platform may execute one or more protection actions. In addition, in executing the one or more protection actions, the computing platform may generate a first alert message comprising information indicating that the first message of the plurality of messages is potentially malicious. Subsequently, the computing platform may send, via the communication interface, to the messaging server associated with the operator, the first alert message comprising the information indicating that the first message of the plurality of messages is potentially malicious. In addition, by sending the first alert message to the messaging server associated with the operator, the computing platform may cause the messaging server associated with the operator to deliver the first alert message comprising the information indicating that the first message of the plurality of messages is potentially malicious to at least one computing device associated with an intended recipient of the first message of the plurality of messages.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface; and
   memory storing computer-readable instructions that, when executed by the at least one processor, cause the computing platform to:
   analyze a first message of a first plurality of messages:
   in response to detecting that the first message of the first plurality of messages, received by a messaging server associated with an operator, is legitimate:
      store information associated with the first message of the first plurality of messages for a predetermined amount of time;
      reanalyze the first message of the first plurality of messages;
      detect, based on the reanalysis, whether the first message of the first plurality of messages has changed from a legitimate state to a potentially malicious state; and
   in response to detecting that the first message of the first plurality of messages has changed from the legitimate state to the potentially malicious state, execute one or more protection actions, wherein executing the one or more protection actions comprises:
      sending, to the messaging server associated with the operator, a first alert message, different than the first message, indicating that the first message is potentially malicious, wherein sending the first alert message to the messaging server causes the messaging server to:
      deliver the first alert message in a same conversation thread as the first message, and
      cause presentation, via a graphical user interface (GUI), of the first alert message at a same time as the first message, wherein the first alert message includes a source identifier of a source of the first message, and wherein inclusion of the source identifier in the first alert message causes the first alert message to resemble a message sent from the source of the first message;
identify an external entity being impersonated in both the first message and a second message of a second plurality of messages received by the messaging server; and
send, via the communication interface, to a computer system of the external entity, a second alert message comprising information indicating that the first message and the second message comprise a malicious campaign of messages targeting customers of the external entity.

2. The computing platform of claim 1, wherein monitoring the first plurality of messages received by the messaging server associated with the operator comprises:
sending, via the communication interface, to the messaging server associated with the operator, a request for new messages being processed by the messaging server associated with the operator; and
receiving, via the communication interface, from the messaging server associated with the operator, the first plurality of messages.

3. The computing platform of claim 1, wherein monitoring the first plurality of messages received by the messaging server associated with the operator comprises:
monitoring one or more short message service (SMS) messages received by the messaging server for delivery;
monitoring one or more multimedia messaging service (MMS) messages received by the messaging server for delivery; or
monitoring one or more rich communication services (RCS) messages received by the messaging server for delivery.

4. The computing platform of claim 1, wherein detecting that the first message of the first plurality of messages is potentially malicious comprises identifying that the first message of the first plurality of messages contains one or more of: spam content or phishing content.

5. The computing platform of claim 1,
wherein the source identifier comprises a trusted source identifier associated with the computing platform, and
wherein sending the first alert message to the messaging server associated with the operator causes the messaging server associated with the operator to deliver the first alert message as originating from the trusted source identifier associated with the computing platform.

6. The computing platform of claim 1,
wherein sending the first alert message to the messaging server associated with the operator causes the messaging server associated with the operator to deliver the first alert message to at least one computing device associated with an intended recipient of the first message of the first plurality of messages prior to delivering the first message of the first plurality of messages to the at least one computing device associated with the intended recipient of the first message of the first plurality of messages.

7. The computing platform of claim 1, wherein executing the one or more protection actions comprises:
generating a third alert message comprising information associated with the first message of the first plurality of messages; and
sending, via the communication interface, to the messaging server associated with the operator, the third alert message comprising the information associated with the first message of the first plurality of messages,
wherein sending the third alert message to the messaging server associated with the operator causes the messaging server associated with the operator to write one or more log lines to one or more system logs associated with the operator.

8. The computing platform of claim 1, wherein executing the one or more protection actions comprises:
identifying the external entity associated with the potentially malicious content included in the first message of the first plurality of messages;
generating a third alert message comprising information associated with the first message of the first plurality of messages; and
sending, via the communication interface, to the computer system of the external entity associated with the potentially malicious content included in the first message of the first plurality of messages, the third alert message comprising the information associated with the first message of the first plurality of messages.

9. The computing platform of claim 8, wherein identifying the external entity associated with the potentially malicious content included in the first message of the first plurality of messages comprises identifying the external entity associated with the potentially malicious content included in the first message of the first plurality of messages based on one or more templates associated with the external entity.

10. The computing platform of claim 8, wherein generating the third alert message comprising the information associated with the first message of the first plurality of messages comprises inserting, into the third alert message, information indicating that the first message of the first plurality of messages is associated with the malicious campaign of messages targeting users associated with the external entity.

11. The computing platform of claim 1, wherein the memory stores additional computer-readable instructions that, when executed by the at least one processor, cause the computing platform to:
in response to detecting that the second message of the second plurality of messages is potentially malicious, execute one or more second protection actions, wherein executing the one or more second protection actions comprises:
generating a third alert message comprising information indicating that the second message of the second plurality of messages is potentially malicious; and
sending, via the communication interface, to the messaging server associated with the operator, the third alert message comprising the information indicating that the second message of the second plurality of messages is potentially malicious,
wherein sending the third alert message to the messaging server associated with the operator causes the messaging server associated with the operator to deliver the third alert message comprising the information indicating that the second message of the second plurality of messages is potentially malicious to at least one computing device associated with an intended recipient of the second message of the second plurality of messages.

12. The computing platform of claim 1, wherein the memory stores additional computer-readable instructions that, when executed by the at least one processor, cause the computing platform to:
  monitor the second plurality of messages received by the messaging server associated with the operator; and
  detect that the second message of the second plurality of messages is potentially malicious.

13. The computing platform of claim 1, wherein the memory stores additional computer-readable instructions that, when executed by the at least one processor, cause the computing platform to:
  generate the second alert message comprising information indicating that the first message of the first plurality of messages and the second message of the second plurality of messages comprise the malicious campaign of messages targeting customers of the external entity.

14. A method, comprising:
  at a computing platform comprising at least one processor, a communication interface, and memory:
    analyze a first message of a first plurality of messages;
    in response to detecting that the first message of the first plurality of messages, received by a messaging server associated with an operator, is legitimate:
      store information associated with the first message of the first plurality of messages for a predetermined amount of time;
      reanalyze the first message of the first plurality of messages; and
      detect, based on the reanalysis, whether the first message of the first plurality of messages has changed from a legitimate state to a potentially malicious state;
    in response to detecting that the first message of the first plurality of messages has changed state from the legitimate state to the potentially malicious state, execute one or more protection actions, wherein executing the one or more protection actions comprises:
      sending, to the messaging server associated with the operator, a first alert message, different than the first message, indicating that the first message is potentially malicious, wherein sending the first alert message to the messaging server causes the messaging server to:
        deliver the first alert message in a same conversation thread as the first message, and
        cause presentation, via a graphical user interface (GUI), of the first alert message at a same time as the first message, wherein the first alert message includes a source identifier of a source of the first message, and wherein inclusion of the source identifier in the first alert message causes the first alert message to resemble a message sent from the source of the first message;
    identifying an external entity being impersonated in both the first message and a second message of a second plurality of messages received by the messaging server; and
    sending, via the communication interface, to a computer system of the external entity, a second alert message comprising information indicating that the first message and the second message comprise a malicious campaign of messages targeting customers of the external entity.

15. One or more non-transitory computer-readable media storing instructions that, when executed by a computing platform comprising at least one processor, a communication interface, and memory, cause the computing platform to:
  analyze a first message of a first plurality of messages;
  in response to detecting that a first message of a first plurality of messages, received by a messaging server associated with an operator, is legitimate:
    store information associated with the first message of the first plurality of messages for a predetermined amount of time;
    reanalyze the first message of the first plurality of messages; and
    detect, based on the reanalysis, whether the first message of the first plurality of messages has changed from a legitimate state to a potentially malicious state;
  in response to detecting that the first message of the first plurality of messages has changed state from the legitimate state to the potentially malicious state, execute one or more protection actions, wherein executing the one or more protection actions comprises:
    sending, to the messaging server associated with the operator, a first alert message, different than the first message, indicating that the first message is potentially malicious, wherein sending the first alert message to the messaging server causes the messaging server to:
      deliver the first alert message in a same conversation thread as the first message, and
      cause presentation, via a graphical user interface (GUI), of the first alert message at a same time as the first message, wherein the first alert message includes a source identifier of a source of the first message, and wherein inclusion of the source identifier in the first alert message causes the first alert message to resemble a message sent from the source of the first message;
  identify an external entity being impersonated in both the first message and a second message of a second plurality of messages received by the messaging server; and
  send, via the communication interface, to a computer system of the external entity, a second alert message comprising information indicating that the first message and the second message comprise a malicious campaign of messages targeting customers of the external entity.

16. The computing platform of claim 1, wherein the presentation of the first alert message at the same time as the first message causes the first alert message to be temporally relevant and contextually relevant to a recipient of the first alert message by indicating a threat context of the first message in substantially real time.

17. The computing platform of claim 1, wherein the source identifier comprises a telephone number, and wherein delivering the first alert message comprises causing the messaging server to deliver the first alert message as originating from the telephone number.

18. The computing platform of claim 1, wherein detecting that the first message has changed from the legitimate state to the potentially malicious state comprises identifying that data associated with a sender of the first message has been updated during the predetermined amount of time, wherein the change in state is based on the update to the data associated with the sender.

19. The computing platform of claim 1, wherein detecting that the first message of the first plurality of messages has changed from the legitimate state to the potentially malicious state identifying that data associated with a website link included in the first message has been updated during the predetermined amount of time, wherein the change in state is based on the update to the data associated with the website link.

20. The computing platform of claim 1, wherein detecting that the first message has changed from the legitimate state to the potentially malicious state comprises identifying that a machine learning model, used to detect that the first message is legitimate, has been updated during the predetermined amount of time, wherein the change of message state is based on the update to the machine learning model.

* * * * *